Feb. 16, 1965   D. N. ROBERTS   3,169,643
ARTICLE HANDLING DEVICE
Filed Dec. 12, 1961
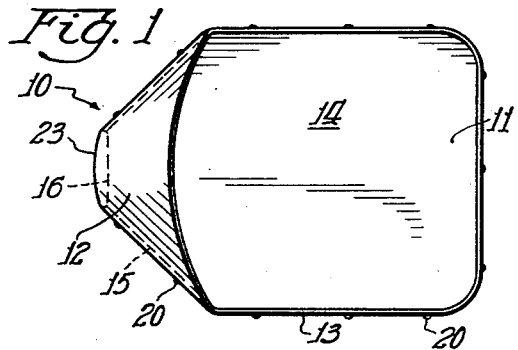
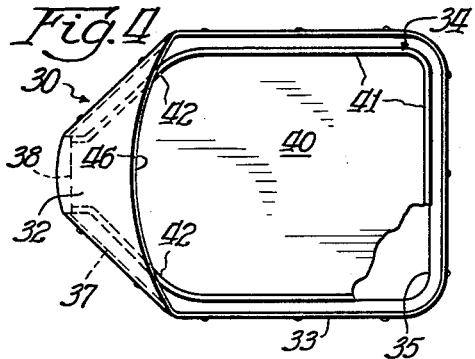
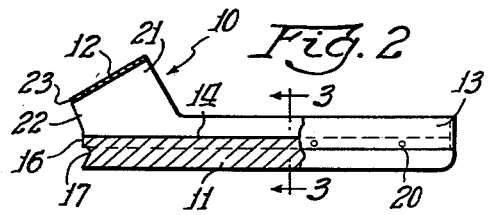
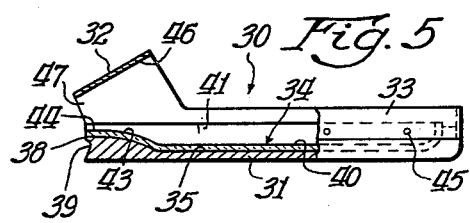
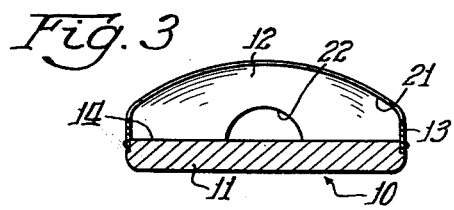
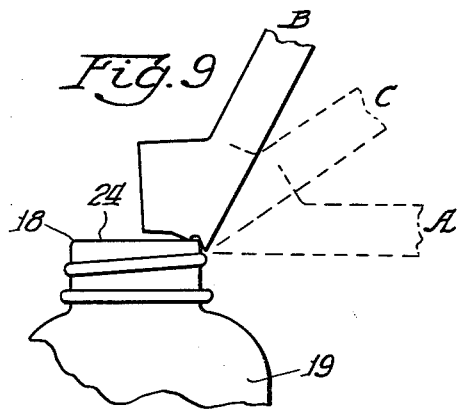
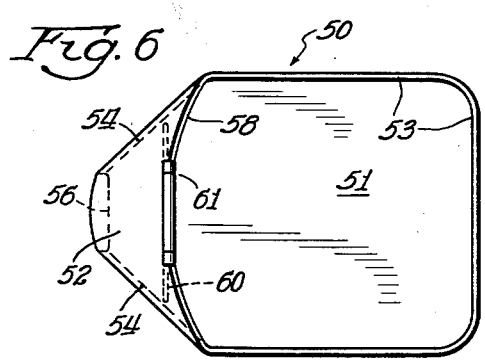
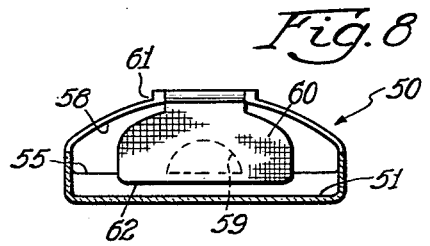
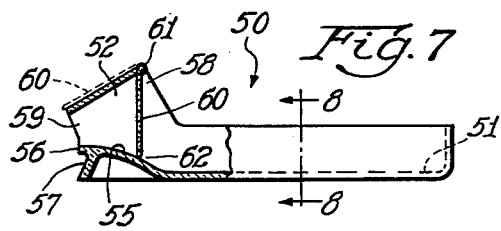
Inventor:
Dale N. Roberts
By: Evan D. Roberts, Atty.

United States Patent Office 3,169,643
Patented Feb. 16, 1965

3,169,643
ARTICLE HANDLING DEVICE
Dale N. Roberts, 2 E. 155th St., Harvey, Ill.
Filed Dec. 12, 1961, Ser. No. 158,912
8 Claims. (Cl. 214—1)

This invention relates to a small article handling device and more particularly to a device for handling a collection of small, commingled, dissimilar objects to be sorted or cleaned.

It is a common practice to store dissimilar, commingled, assorted articles such as different size screws, bolts, nuts, etc., in a single container. Unfortunately, this practice prevents ready selection of any given article or articles from the container. More particularly, inasmuch as the confines of the container cause the assorted articles to be in a compact commingled array, it is very difficult to find and select any given article from among the array. Further, if the articles are removed from the container in an effort to make a selection of certain articles, it is a difficult and time consuming task to gather the articles together and return them to the storage container.

It would, therefore, be highly desirable to provide a device whereby dissimilar articles, stored in a container, could be readily received from the container, displayed in a manner which would facilitate selection of certain of the articles, and which would facilitate ready return of the remaining articles to the storage container.

It is an object of this invention to provide a small article handling device of simple and economical construction for facilitating the manipulation of small articles.

The primary object of this invention resides in providing a small article handling device which provides a ready means for receiving articles from a container, manipulating the articles, and which facilitate the return of the articles to confines of the container.

Another object of this invention is to provide a small article handling device which provides a means for treating articles with a fluid, and which facilitates removal of the fluid from the articles and the device as well as facilitating the removal of articles from the device.

With these and other objects in view, the present invention contemplates a small article handling device having a sorting and cleaning platform which extends into a tapered platform, the tapered platform having a tapered guide arched thereover and providing a small opening adjacent the small end of the tapered portion of the platform. The tapered platform having a groove adapted to engage the mouth of a container for providing a fulcrum about which the device may be pivoted to tilt the device to cause the articles to move by force of gravity from the platform through the guide and through the small guide aperture into the container.

Other objects, advantages, and novel aspects of the invention will become apparent upon consideration of the following detailed description in conjunction with the accompanying drawings wherein:

FIG. 1 is a top view of the first embodiment of the article handling device showing the relative position of the guide and the platforms.

FIG. 2 is a partially sectioned side view of the first embodiment of the material handling device showing the configuration of the guide and the fulcrum groove adjacent thereto.

FIG. 3 is a sectional view of the first embodiment taken along line 3—3 of FIG. 2 showing the configuration of the guide openings.

FIG. 4 is a top view of a second embodiment of the article handling device showing the second embodiment platform including a tray mounted therein.

FIG. 5 is a partially sectioned side view of the second embodiment of the material handling device showing the shape of the tray.

FIG. 6 is a top view of another embodiment of the material handling device showing the position of a screen used for separating a fluid from the articles.

FIG. 7 is a partially sectioned side view of the third embodiment of the article handling device showing the position of the screen.

FIG. 8 is a sectional view of the third embodiment of the device taken along lines 8—8 of FIG. 7 showing the relationship between the screen and the platform.

FIG. 9 is a view illustrating the position of the device relative to the container as the articles are returned to the container.

Referring to the drawings, a first embodiment of the device is illustrated in FIGS. 1–3 and is generally referred to by the numeral 10. The device 10 includes, generally, a body 11, a guide 12, and a side wall 13.

The main body portion 11 has a platform surface 14, tapered side surfaces 15 and a short substantially straight end surface 16 between the tapered surfaces 15. A groove 17 is formed in the end surface 16 and is adapted to receive a lip 18 of a mouth 24 of an article storage container 19 (FIG. 9) to allow the body 11 to be pivoted counterclockwise about the lip 18 to a B or C position in the manner illustrated.

The guide 12 is secured to the body 11 on the tapered surfaces 15 by screws or other similar suitable means 20 and is in arched relation to the platform surface 14 between the tapered surfaces 15. The guide 12 provides a large flat-sided opening 21 (FIG. 3) adjacent the central portion of the platform 14 and tapers toward the end 16, along the tapered surfaces 15, to provide a similar smaller opening 22 adjacent the small end 16. It should be noted that an upper portion 23 of the guide, adjacent the smaller opening 22 may be made to extend forward or to the left (FIGS. 1 and 2) slightly beyond the end 16. This brings the small opening 22 of the guide 12 closer to the container lip when the device is pivoted to the B or C position (FIG. 9) and also acts as a deflector for the articles to direct the articles in a general direction parallel to the platform 14.

The side wall 13 is secured to the body by the screws or other appropriate means 20 and extends upwardly from the platform surface 14 (FIGS. 1–3) to form a confining wall for articles placed on the platform 14. The side wall 13 may be an extension of the guide 12 (FIG. 2) or may be a separate piece and is effective to form a continuation of the guide 12 to partially or completely encircle the platform 14.

In operation, a collection of articles, which may be commingled assorted articles stored in a single container similar to the container 19 (FIG. 9) are poured from the container onto the platform surface 14. The articles may be manually dispersed on the platform so as to facilitate selection of any of the articles and the wall 13 will confine the articles to the platform surface 14. After the article selection is completed, the device 10 and the storage container 19 are moved into interengaging position A (FIG. 9) with the groove 17 in engagement with the lip 18 of the container 19. Thereafter, the device 10 is pivoted counterclockwise about the container lip 18 to the raised position B (FIG. 9) with the small opening 22 positioned over the container opening 24 defined by the lip 18. The articles remaining on the platform surface 14 will thereupon be urged by gravity to move along the platform 14 toward the small guide opening 22 and will be guided through the small guide opening 22 by the guide 12 and the tapered leftmost portion of the platform 14. The articles will thereby pass through the container opening 24 and be returned to the container 19.

A second embodiment of the device is illustrated in FIGS. 4–6 and is generally referred to by the numeral 30. The device 30 includes generally, a body portion 31, a guide 32, a side wall 33 and a tray 34. The main body portion 31 has an upper concave surface 35 in which the tray 34 is seated. The body portion 31 is provided with tapered sides 37 and a short end surface 38 between the tapered surfaces. A groove 39 is formed in the end surface 38 and is adapted to receive a lip 18 of an article storage container 19 (FIG. 9) to allow the body 31 to be pivoted about the lip 18 in a manner as illustrated.

The tray is provided with a platform surface 40, three upwardly extending sides 41, and two tapered sides 42 substantially parallel to the tapered sides 37 of the body portion 31. The tray 34 is also tapered upwardly to the left (FIG. 5) along a surface 43 and extends into a flat surface 44.

The guide 32 is secured to the body 31 on the sides of the body 31 by screws or other similar suitable means 45. The guide 32 is provided with a large opening 46 adjacent the central portion of the tray 34 and tapers toward the end 38 along the tapered surfaces 37 to a smaller opening 47 adjacent the small end 38 of the body. The side wall 33 may not be necessary if the tray sides 41 are high enough; however, the body walls 33 may be secured to the body portion by the screws or other appropriate means 45 and extends upwardly from the upper portion of the body to form an additional confining wall for articles placed in the tray. The side wall may be an extension of the guide (FIG. 5) or may be a separate piece, and is effective to form a continuation of the guide to partially or completely encircle the tray.

The operation of the second embodiment of applicant's invention is generally the same as the operation of the first embodiment. However, in the operation of the second embodiment, the articles are placed on the platform surface 40 in the tray 34 for sorting and selection instead of on a flat platform surface 14 as in the first embodiment. Further, in the second embodiment the articles may be partially or completely submerged in a treating fluid in the tray 34 so that they may be cleaned or otherwise treated prior to or during the selection of articles from the collection placed in the tray 34.

Thereafter, the fluid may be separately poured from the tray through the small opening 47, without removing the articles, by rotating the device 30 counterclockwise about the guide opening 47 to an intermediate position C (FIG. 11) so that the surface 43 is substantially horizontal. In this position, the fluid will be free to flow out of the opening 59 but the articles will be held in the tray 34 due to friction between the articles and the surfaces 40 and 43.

After the treating fluid is removed, the articles in the tray 34 are removed from the tray by pivoting the device 30 counterclockwise about the container lip 18 to the completely raised position B (FIG. 9) with the small opening 22 positioned over the container opening 24. The articles remaining in the tray 34 will thereupon be urged by gravity to move along the surface 40 toward the small guide opening 47 and will be guided through the opening 47 by the guide 32 and the surfaces 43 and 44, through the container opening 24 and will thereby be returned to the container 19.

A third embodiment of the device is illustrated in FIGS. 6–8 and is generally referred to by the numeral 50. The device 50 can be made of plastic, metal or other moldable material and includes a platform 51, a guide 52, and side walls 53. The platform 51 is surrounded on three sides by the walls 53 and has tapered sides 54. The platform also tapers upwardly toward the left along a surface 55 (FIG. 7) between the tapered sides 54 and terminates along an end 56 of the platform 51. A groove 57 is formed in the end of the platform and is adapted to engage the lip 18 of the storage container 19 (FIG. 9) in a manner similar to the engagement of the groove 17 of the first embodiment 10.

The guide 52 is formed in arched relationship with the platform 51 between the tapered sides 54 and forms a continuation of the side wall 53. The guide 52 provides a large opening 58 adjacent the central portion of the platform 51, and a small opening 59 adjacent the end 56. A screen 60 is hinged to the guide 52 at 61 at the top of the large opening 58, and is thereby adapted to be pivoted counterclockwise from a vertical down position (FIGS. 6, 7 and 8) to an upper removed position illustrated by the dotted line in FIG. 7. The screen 60 is provided with a lower edge 62 which is complementary with the tapered platform surface 55 when the screen 60 is in the down position (FIG. 7).

In operation, the third embodiment 50 of this invention is utilized in a manner similar to the manner in which the second embodiment 30 is utilized. However, in the operation of the third embodiment 50, a screen 60 retains the articles on the platform 51 when the device 50 is pivoted to the C or B position (FIG. 11) to remove the solvent or other treating material used. More particularly, in the operation of the device 50, articles to be sorted or selected are placed on the platform 51 in a solvent or other treating material which is retained on the platform 51 by the side walls 53 and the slanted or tapered platform surface 55. When the solvent is to be removed, the screen is placed in the vertical down position (FIGS. 6, 7 and 8). The device is pivoted about the small guide opening 59 to the C or B position (FIG. 9). The fluid will flow through the screen 60 but the screen will retain the articles. Thus, the treating fluid will be removed from the device and the articles. The device 50 is then returned to the A position (FIG. 9) and the screen 60 is pivoted counterclockwise about the hinge 61 to the upper removed dotted position (FIG. 7) whereupon the device 50 is again placed with the groove 57 in engagement with the lip 18 of the storage container 19 and is pivoted to the B position. Gravity will urge the articles to move toward the guide 52 and the guide will direct the articles through the small guide opening 59 into the container 19.

I wish it to be understood that the invention is not to be limited to the specific constructions and arrangements shown and described, except only insofar as the claims may be so limited, as it will be understood to those skilled in the art that changes may be made without departing from the principles of the invention.

I claim:

1. A device for handling articles of the type which may be stored in a container having a lip defining an open mouth for the container comprising a plane surface platform having a tapered end portion and a guide secured to said platform in arched relation to said tapered end portion of said platform, said guide defining a large opening adjacent the non-tapered portion of said platform and a small opening adjacent the small end of said tapered portion of said platform for guiding articles moved along said platform by force of gravity when the device is inclined to direct the articles through the small guide opening, said platform having a lateral pivot groove formed in the edge of the small end thereof adapted for pivotally receiving the lip of the container to allow the device to be pivoted about the lip to an inclined position with the small guide opening over the container mouth, said guide having the upper portion of the small end thereof extending partially beyond the small end of the platform for directing articles passing through the small guide opening toward the plane of said platform to cause the articles to flow in a direction substantially toward said platform.

2. A device for handling articles of the type which may be stored in an open-mouthed container comprising a plane surface platform having a tapered end portion, a guide secured to said platform in arched relation to said tapered end portion of said platform, said guide defining a large opening adjacent the non-tapered portion of said platform and a small opening adjacent the small end of said tapered portion of said platform for guiding articles moved along said platform by force of gravity when the device is inclined to direct the articles through the small guide opening, said guide having the upper portion of the small end thereof extending partially beyond the small end of the platform for directing articles passing through the small guide opening to urge the articles in a direction substantially toward said platform, and a wall perpendicular to said platform and secured thereto adjacent the periphery of said platform for providing a retainer for articles placed on said platform.

3. A device for handling articles of the type which may be stored in a container having a lip defining an open mouth for the container comprising a platform having a tapered end portion and having a recess formed therein, a guide secured to said platform in arched relation to said tapered end portion of said platform, said guide defining a large opening adjacent the non-tapered portion of the platform and a small opening adjacent the small end of said tapered portion of said platform, and a tray seated in the recess of said platform, said tray having wall portions extending upwardly therefrom through lines substantially parallel to respective adjacent sides of said platform for retaining articles to be handled and for retaining article treating fluid.

4. A device for handling articles of the type which may be stored in a container having a lip defining an open mouth for the container comprising a platform having a tapered end portion and having a recess formed therein, a guide secured to said platform in arched relation to said tapered end portion of said platform, said guide defining a large opening adjacent the non-tapered portion of the platform and a small opening adjacent the small end of said tapered portion of said platform, and a tray seated in the recess of said platform, said tray having wall portions extending upwardly therefrom through lines substantially parallel to respective adjacent sides of said platform for retaining articles to be handled and for retaining article treating fluid, said tray having an upwardly tapered bottom portion beneath said guide for providing an inclined surface to retain the fluid and the articles when the device is substantially level and to allow the treating fluid to flow from the tray through the small guide opening and retain the articles when the device is inclined.

5. A device for handling articles of the type which may be stored in a container having a lip defining an open mouth for the container comprising a platform having a tapered end portion and having a recess formed therein, a guide secured to said platform in arched relation to said tapered end portion of said platform, said guide defining a large opening adjacent the non-tapered portion of said platform and a small opening adjacent the small end of said tapered portion of said platform for guiding articles moved along said platform by force of gravity when the device is inclined to direct the articles through the small guide opening, a tray seated in the recess of said platform, said tray having wall portions extending upwardly therefrom through lines substantially parallel to respective adjacent sides of said platform for retaining articles to be handled and for retaining article-treating fluid, said tray having an upwardly tapered bottom portion beneath said guide for providing an inclined surface to retain the fluid and the articles when the device is substantially level and to allow the treating fluid to flow from the tray through the small guide opening and retain the articles when the device is inclined at an angle which places said tapered bottom tray portion in a substantially horizontal position, and a wall perpendicular to said platform and secured thereto adjacent the periphery of said platform for providing a retainer for articles contained in said tray on said platform, said platform having a lateral groove formed in the edge of the small end thereof adapted for pivotally receiving the lip of the container to allow the device to be pivoted about the lip to any inclined position with the small guide opening over the container mouth.

6. A device for handling articles of the type which may be stored in a container having a lip defining an open mouth for the container comprising a platform having a tapered end portion, and a recess formed therein, a guide secured to said platform in arched relation to the tapered end portion of said platform, said guide defining a large opening adjacent the non-tapered portion of said platform and a small opening adjacent the small end of said tapered portion of said platform for guiding articles moved along said platform by force of gravity when the device is inclined to direct the articles through the small guide opening, a tray seated in the recess of said platform, said tray having wall portions extending upwardly therefrom through lines substantially parallel to respective adjacent sides of said platform for retaining articles to be handled and for retaining an article treating fluid, said tray having an upwardly tapered bottom portion beneath said guide for providing an inclined surface to retain the fluid and the articles when the device is substantially level and to allow the treating fluid to flow from the tray through the small guide opening and retain the articles when the device is inclined to a predetermined angle, and a wall perpendicular to said platform and secured thereto adjacent the periphery of said platform for providing a retainer for articles contained on said platform, said platform having a lateral groove formed in the edge of the small end thereof adapted for pivotally receiving the lip of the container to allow the device to be pivoted about the lip to any inclined position with the small guide opening over the container mouth, said guide having the upper portion of the small end thereof extending partially beyond the small end of the platform for directing articles passing through the small guide opening to cause the articles to flow in a direction substantially parallel to said platform.

7. A device for handling articles of the type which may be stored in a container having a lip defining an open mouth for the container comprising a platform having a tapered end portion, a guide secured to said platform in arched relation to said tapered end portion of said platform, said guide defining a large opening adjacent the non-tapered portion of the platform and a small opening adjacent the small end of the tapered portion of said platform, and a wall perpendicular to said platform and secured thereto adjacent the periphery of said platform for providing a retainer for articles placed on said platform, said platform tapering upwardly beneath said guide for providing a raised portion to retain articles and fluid on said platform, and a screen pivotally connected to said guide and normally positioned out of the path of articles moved through said guide and adapted to be pivoted into engagement with said upwardly tapered portion of said platform for retaining articles on said platform when the device is level and for retaining articles on said platform and allowing fluid to pass therethrough to separate the fluid from the articles on the platform when the device is pivotally tilted about the container lip toward the small guide opening.

8. A device for handling articles of the type which may be stored in a container having a lip defining an open mouth for the container comprising a plane platform having a tapered end portion, a guide secured to said platform in arched relation to said tapered end portion of said platform, said guide defining a large opening adjacent the non-tapered portion of the platform and a small opening adjacent the small end of said tapered portion of said platform for guiding articles moved along said platform by force of gravity when the device is inclined to direct the articles through the small guide opening, said platform having a lateral pivot groove formed in the edge of the small end thereof adapted for pivotally receiving the lip of the container to allow the device to be pivoted about the lip to an inclined position with the small guide opening over the container mouth, a wall perpendicular to said platform and secured thereto adjacent the periphery of said platform for providing a retainer for articles and fluid on said platform, said platform tapering upwardly beneath said guide for providing a raised portion to retain fluid on said platform, and a screen pivotally connected to said guide normally out of the path of articles moved through said guide and adapted to be pivoted into engagement with said upwardly tapered portion of said platform for retaining articles on said platform when the device is level and for retaining articles on said platform and allowing fluid to pass therethrough to separate the fluid from the articles on the platform when the device is pivotally tilted about the container lip toward the small guide opening, said guide having the upper portion of the small end thereof extending partially beyond and above the small end of the platform for directing articles passing through the small guide opening toward the plane of said platform to cause the articles to flow in a direction substantially parallel to said platform.

References Cited by the Examiner

UNITED STATES PATENTS

| | | | |
|---|---|---|---|
| 84,018 | 11/68 | Strickland | 222—189 |
| 220,576 | 10/79 | Chilis | 141—334 X |
| 334,459 | 1/86 | Obermann | 222—189 |
| 384,711 | 6/88 | Pratt | 232—65 |
| 475,086 | 5/92 | Lockwood | 232—65 |
| 1,032,771 | 7/12 | Prichard | 222—571 |
| 1,317,358 | 9/19 | Dovener | 232—65 |
| 1,692,039 | 11/28 | Hinz | 141—340 X |
| 2,703,670 | 3/55 | Voight | 141—340 |
| 2,812,784 | 11/57 | Palmer | 141—333 X |
| 2,891,703 | 6/59 | Hassler | 222—532 X |
| 2,952,369 | 9/60 | Rew. | |

FOREIGN PATENTS

| | | |
|---|---|---|
| 10,392 | 5/08 | Great Britain. |
| 271,975 | 6/27 | Great Britain. |

HUGO O. SCHULZ, *Primary Examiner.*